US011953762B2

(12) United States Patent
Bailey et al.

(10) Patent No.: US 11,953,762 B2
(45) Date of Patent: *Apr. 9, 2024

(54) CONTACT LENS COMPRISING A LENTICULAR IN A SUPERIOR PORTION OF THE CONTACT LENS

(71) Applicant: Ohio State Innovation Foundation, Columbus, OH (US)

(72) Inventors: Melissa D. Bailey, Westerville, OH (US); Joseph T. Barr, Dublin, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 422 days.

This patent is subject to a terminal disclaimer.

(21) Appl. No.: 17/331,059

(22) Filed: May 26, 2021

(65) Prior Publication Data

US 2021/0382323 A1   Dec. 9, 2021

Related U.S. Application Data

(63) Continuation of application No. 16/335,999, filed as application No. PCT/US2017/048617 on Aug. 25, (Continued)

(51) Int. Cl.
    *G02C 7/04*      (2006.01)
(52) U.S. Cl.
    CPC ............. *G02C 7/048* (2013.01); *G02C 7/043* (2013.01); *G02C 7/045* (2013.01); *G02C 7/047* (2013.01); *G02C 7/049* (2013.01)
(58) Field of Classification Search
    CPC ........ G02C 7/043; G02C 7/045; G02C 7/047; G02C 7/048; G02C 7/049
(Continued)

(56) References Cited

U.S. PATENT DOCUMENTS

| 4,573,775 A | 3/1986 | Bayshore |
| 4,614,413 A | 9/1986 | Obssuth |

(Continued)

FOREIGN PATENT DOCUMENTS

| CN | 101506717 | 8/2009 |
| CN | 102621710 | 8/2012 |

(Continued)

OTHER PUBLICATIONS

Office Action issued for Korean Patent Application No. 10-2019-7011606, dated Jan. 17, 2022.

(Continued)

*Primary Examiner* — Nicholas R. Pasko
(74) *Attorney, Agent, or Firm* — Meunier Carlin & Curfman LLC

(57) ABSTRACT

Disclosed herein is a contact lens comprising a lenticular in a superior portion of the contact lens wherein the contact lens attaches to an upper eyelid of a wearer by the lenticular interacting with an upper tarsal plate of the upper eyelid of a wearer, said interaction allows the contact lens to translate upwards in downgaze and maintain rotational stability. In one aspect, the lenticular has a top surface, said top surface having a shape selected from the group consisting of flat, flat with rounded corners, concave, convex or tapered having a thicker portion closer to an edge of the contact lens, or combinations thereof. In another aspect, the lenticular is comprised of a plurality of lenticular sections. In yet another aspect, the lenticular is anatomically-shaped.

18 Claims, 8 Drawing Sheets

Related U.S. Application Data 2017, now Pat. No. 11,022,816, which is a continuation-in-part of application No. 15/274,159, filed on Sep. 23, 2016, now Pat. No. 10,191,302.

(60) Provisional application No. 62/222,376, filed on Sep. 23, 2015.

(58) Field of Classification Search
USPC ............ 351/159.03, 159.19, 159.36, 159.39, 351/159.4, 159.6, 159.61, 15, 9.68
See application file for complete search history.

(56) References Cited

U.S. PATENT DOCUMENTS

| | | | |
|---|---|---|---|
| 4,666,267 | A | 5/1987 | Wichterle |
| 4,859,049 | A | 8/1989 | Muller |
| 4,896,958 | A | 1/1990 | Ames et al. |
| 5,056,908 | A | 10/1991 | Cohen |
| 5,104,213 | A | 4/1992 | Wolfson |
| 5,125,728 | A | 6/1992 | Newman et al. |
| 5,141,301 | A | 8/1992 | Morstad |
| 5,166,710 | A | 11/1992 | Hofer et al. |
| 5,245,366 | A | 9/1993 | Svochak |
| 5,296,880 | A | 3/1994 | Webb |
| 5,500,695 | A | 3/1996 | Newman |
| 5,532,768 | A | 7/1996 | Onogi et al. |
| 5,764,339 | A | 6/1998 | Horton |
| 5,912,719 | A | 6/1999 | Baude |
| 5,971,542 | A | 10/1999 | Volker et al. |
| 5,988,813 | A | 11/1999 | Neadle et al. |
| 6,092,899 | A | 7/2000 | Wanders |
| 6,109,749 | A | 8/2000 | Bernstein |
| 6,217,896 | B1 | 4/2001 | Benjamin |
| 6,409,339 | B1 | 6/2002 | Wanders |
| 6,491,392 | B2 | 12/2002 | Roffman et al. |
| 6,773,107 | B2 | 8/2004 | Ye et al. |
| 6,921,168 | B2 | 7/2005 | Lindacher et al. |
| 7,052,133 | B2 | 5/2006 | Lindacher |
| 7,080,906 | B2 | 7/2006 | Lindacher |
| 7,201,480 | B2 | 4/2007 | Neadle et al. |
| 7,384,143 | B2 | 6/2008 | Hall et al. |
| 7,543,935 | B2 | 6/2009 | Ezekiel |
| 7,560,056 | B2 | 7/2009 | Van Gemert et al. |
| 7,695,135 | B1 | 4/2010 | Rosenthal |
| 7,695,435 | B2 | 4/2010 | Benson et al. |
| 8,485,662 | B2 | 12/2013 | Collins |
| 9,823,493 | B2 | 11/2017 | Caldarise et al. |
| 10,175,504 | B2 | 1/2019 | Goto et al. |
| 10,191,302 | B2 * | 1/2019 | Bailey .................... G02C 7/047 |
| 10,598,957 | B2 * | 3/2020 | Bailey .................... G02C 7/048 |
| 11,022,816 | B2 * | 6/2021 | Bailey .................... G02C 7/043 |
| 11,022,817 | B2 * | 6/2021 | Bailey .................... G02C 7/048 |
| 11,320,673 | B2 * | 5/2022 | Bailey .................... G02C 7/048 |
| 2002/0075447 | A1 | 6/2002 | Andino |
| 2003/0151718 | A1 | 8/2003 | Marmo |
| 2004/0017542 | A1 | 1/2004 | Lindacher et al. |
| 2004/0057010 | A1 | 3/2004 | Altmann |
| 2005/0068489 | A1 | 3/2005 | Hall et al. |
| 2005/0099595 | A1 | 5/2005 | Lindacher |
| 2005/0251065 | A1 | 11/2005 | Henning et al. |
| 2006/0290883 | A1 | 12/2006 | Rosenthal |
| 2008/0013044 | A1 | 1/2008 | Wanders |
| 2008/0262812 | A1 | 10/2008 | Arata et al. |
| 2010/0153081 | A1 | 6/2010 | Belletre et al. |
| 2011/0249235 | A1 | 10/2011 | Duis et al. |
| 2012/0194778 | A1 | 8/2012 | Skudder et al. |
| 2012/0271599 | A1 | 10/2012 | Lavallee et al. |
| 2013/0258275 | A1 | 10/2013 | Toner |
| 2014/0063445 | A1 | 3/2014 | Caldarise et al. |
| 2016/0091737 | A1 | 3/2016 | Kim et al. |
| 2017/0082868 | A1 | 3/2017 | Bailey |
| 2018/0129071 | A1 | 5/2018 | Mdal et al. |
| 2018/0313717 | A1 | 11/2018 | Wang et al. |
| 2019/0391412 | A1 | 12/2019 | Bailey |
| 2021/0382324 | A1 * | 12/2021 | Bailey .................... G02C 7/049 |
| 2022/0163819 | A1 * | 5/2022 | Bailey .................... G02C 7/048 |
| 2023/0161179 | A1 * | 5/2023 | Raasch .................... G02C 7/043 351/159.02 |

FOREIGN PATENT DOCUMENTS

| | | | |
|---|---|---|---|
| CN | 105629504 | | 6/2016 |
| CN | 107811751 | | 3/2018 |
| DE | 102010019961 | A1 | 11/2011 |
| EP | 0102223 | | 3/1984 |
| EP | 0887685 | | 12/1998 |
| EP | 1879064 | | 1/2008 |
| EP | 2622404 | | 6/2018 |
| FR | 2582416 | | 11/1986 |
| GB | 2401954 | | 11/2004 |
| GB | 2497424 | | 6/2013 |
| JP | S5953812 | A | 3/1984 |
| JP | H09325304 | A | 12/1997 |
| JP | 11-514753 | | 12/1999 |
| JP | 2014-48666 | | 3/2014 |
| TW | 201621406 | A | 6/2016 |
| WO | 8907281 | | 8/1989 |
| WO | WO-8907281 | A1 * | 8/1989 .............. G02C 7/04 |
| WO | 92/22845 | | 12/1992 |
| WO | 97/16760 | | 5/1997 |
| WO | 98/14820 | | 4/1998 |
| WO | 2005050291 | | 6/2005 |
| WO | 2015066616 | | 5/2015 |
| WO | 2015194120 | | 12/2015 |
| WO | 2019/046714 | | 3/2019 |

OTHER PUBLICATIONS

Notice of Allowance issued for U.S. Appl. No. 16/642,982, dated Jan. 27, 2022.
English translation of Office Action for Vietnamese Application No. 1-2019-01975 dated Jun. 29, 2023.
English Summary of Office Action for Argentine Application No. 20190102352 dated Jun. 30, 2023.
English translation of Notice of Reasons for Refusal for Japanese Application No. 2022-192875 dated Aug. 8, 2023.
Office Action issued for Japanese Application No. 2019-515919, dated Apr. 5, 2022.
Office Action issued for U.S. Appl. No. 16/642,982, dated Oct. 1, 2021.
Examination Report issued for Australian Application No. 2022202001, dated Apr. 12, 2023.
International Search Report and Written Opinion issued for Application No. PCT/US2020/023528, dated Jun. 4, 2020.
International Search Report and Written Opinion issued for Application No. PCT/US2018/049084, dated Oct. 29, 2018.
International Preliminary Report on Patentability issued for Application No. PCT/US2018/049084, dated Mar. 12, 2020.
International Search Report and Written Opinion for Application No. PCT/US2017/048617. Mailed by the U.S. International Searching Authority dated Nov. 8, 2017. 10 pages.
International Preliminary Report on Patentability issued for Application No. PCT/US2017/048617, dated Mar. 26, 2019, 7 pages.
Extended European Search Report issued by the European Patent Office in Application No. EP17853644.7 dated May 26, 2020. 10 pages.
Communication Pursuant to Rule 164(1) EPC, issued for Application No. 18852131.4, dated May 21, 2021, 11 pages.
Extended European Search Report, issued for Application No. 18852131.4, dated Sep. 21, 2021, 13 pages.
Examination Report issued by the Australian Intellectual Property Office in Australian Application No. 2017330483 dated Feb. 1, 2021. 7 pages.
Office Action issued for Chinese Application No. 201780070220.3, dated Apr. 13, 2020. 13 pages including English translation.
Office Action issued for Chinese Application No. 201780070220.3, dated Sep. 14, 2020.

(56) References Cited

OTHER PUBLICATIONS

Office Action issued for Chinese Application No. 201780070220.3, dated Dec. 22, 2020. 19 pages.

Office Action issued for Chinese Application No. 201780070220.3, dated Jun. 28, 2021.

Office Action and Search Report issued by the Russian Patent Office in Russian Application No. 2019112014 dated Dec. 14, 2020. 15 pages.

English Translation of Decision on Granting Russian Application No. 019112014/28(023349) dated Jul. 15, 2021.

Examination report issued for Indian Application No. 201917014551, dated Mar. 25, 2021.

Office Action issued for Japanese Application No. 2019-515919, dated Aug. 17, 2021.

Bennett, et al., Clinical Contact Lens Practice, 2005, Table 27.5. Biofocal/Multifocal Contact Lens Fitting Guidelines, p. 539.

Barr, Joseph T. "High Ametropia." Contact Lens Practice, edited by Nathan Efron, 2nd ed., Butterworth Heinemann Elsevier, 2010, pp. 298-302. (Year: 2010).

Kennard, D. W., and G. L. Smyth. "The causes of downward eyelid movement with changes of gaze, and a study of the physical factors concerned." The Journal of physiology 166.1 (1963): 178.

Kessing, A new division of the conjunctiva on the basis of X-ray examination, Acta Ophthalmologica vol. 46, 1967, 6 pages.

Kessing, Svend Vedel. "A new division of the conjunctiva on the basis of x-ray examination." Acta ophthalmologica 45.5 (1967): 680-683.

Messer, Prescribing for Astigmatism. Taming Those Tories. Feb. 1, 2016, 2 pages.

Polse, Kenneth A. "Contact Lens Fitting in Aphakia." American Journal of Optometry and Archives of American Academy of Optometry, Mar. 1969, pp. 213-219. (Year: 1969).

Quinn, Thomas G. "Avoiding the Low Riding Lens." Contact Lens Spectrum, Jul. 1, 2000, www.clspectrum.com/issues/2000/July- 2000/ avoiding-the-low-riding-lens. (Year: 2000).

Rueff, et al., Presbyopic and non-presbyopic contact lens opinions and vision correction preferences, Contact Lens and Anterior Eye 40.5 (2017): 323-328.

Snyder, Christopher. "Designing Minus Carrier RGP Lenses." Contact Lens Spectrum, Dec. 1, 1998, www.clspectrum.com/issues/ 1998/december-1998/designing-minus-carrier-rgp-lenses. (Year: 1998).

Young, Graeme. "Mathematical model for evaluating soft contact lens fit." Optometry and Vision Science 91.7 (2014): e167-e176.

Raasch, T. Aberrations and spherocylindrical powers within subapertures of freeform surfaces. J. Opt. Soc. Am. A 28, 2642-2646 (2011).

Examination Report issued for Malaysian Application No. PI 2019001627, dated Oct. 5, 2022.

European Search Report issued for Application No. 20773904.6, dated Dec. 6, 2022.

Communication Pursuant to Article 94(3) EPC, issued for Application No. 18852131.4, dated May 25, 2023.

Korean Intellectual Property Office. Final Office Action. Issued in Patent Application No. 10-2019-7011606, dated Jul. 27, 2022. 5 pages, including translation.

Brazilian Intellectual Property Office. Preliminary Office Action. Issued in Brazilian Patent Application No. BR112019005750-1, dated Aug. 31, 2022. 5 pages, including translation.

Intellectual Property Corporation of Malaysia. Examination Report. Issued in Malaysian Application No. PI 2019001627, dated Oct. 5, 2022. 2 pages.

U.S. Patent and Trademark Office. International Search Report and Written Opinion. Issued in PCT Application No. PCT/US2021/ 026409, dated Jul. 22, 2021. 17 pages.

Office Action issued for U.S. Appl. No. 17/331,079, dated Sep. 22, 2023.

Office Action issued for Canadian Application No. 3,038,057 dated Aug. 21, 2023.

\* cited by examiner

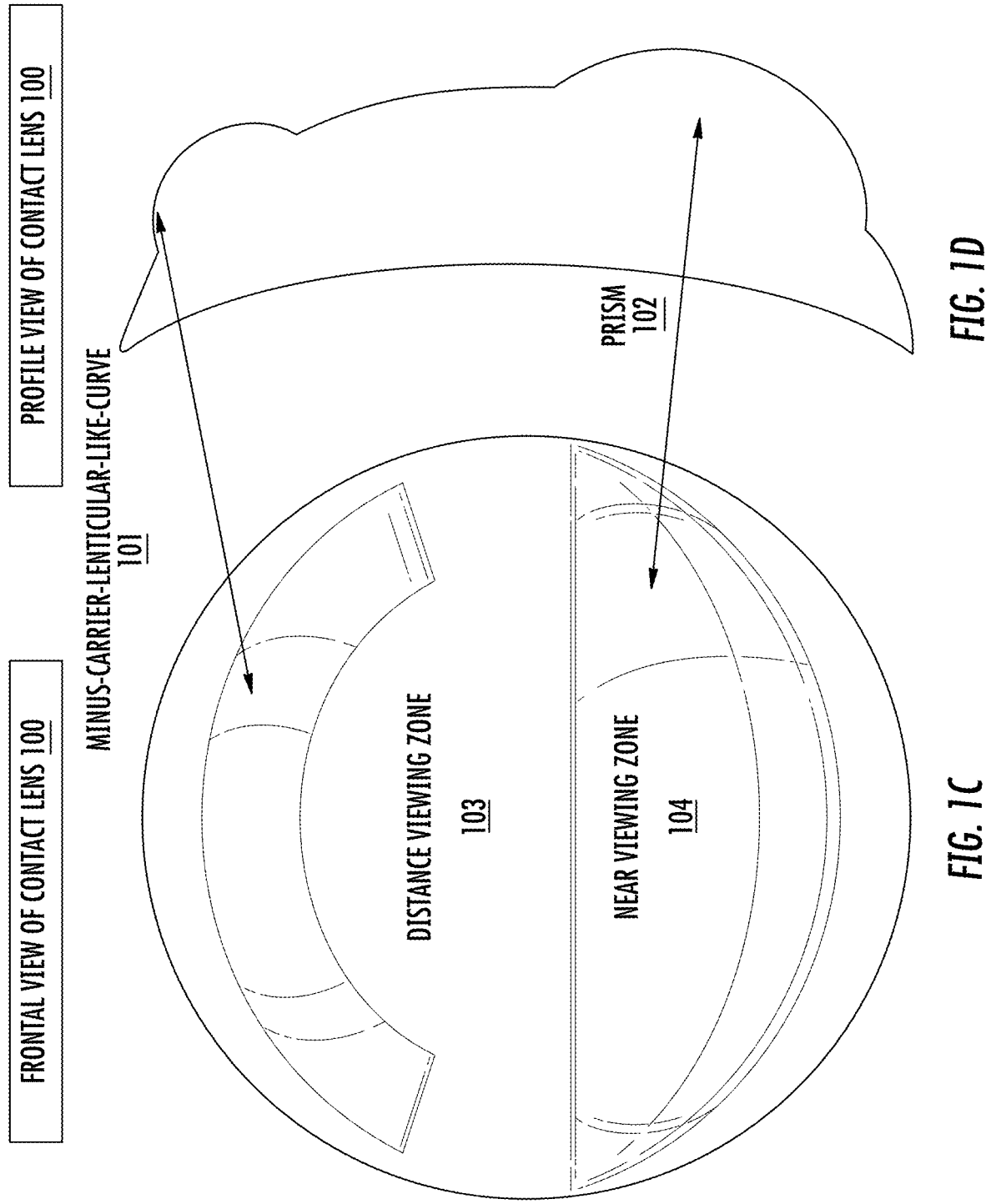

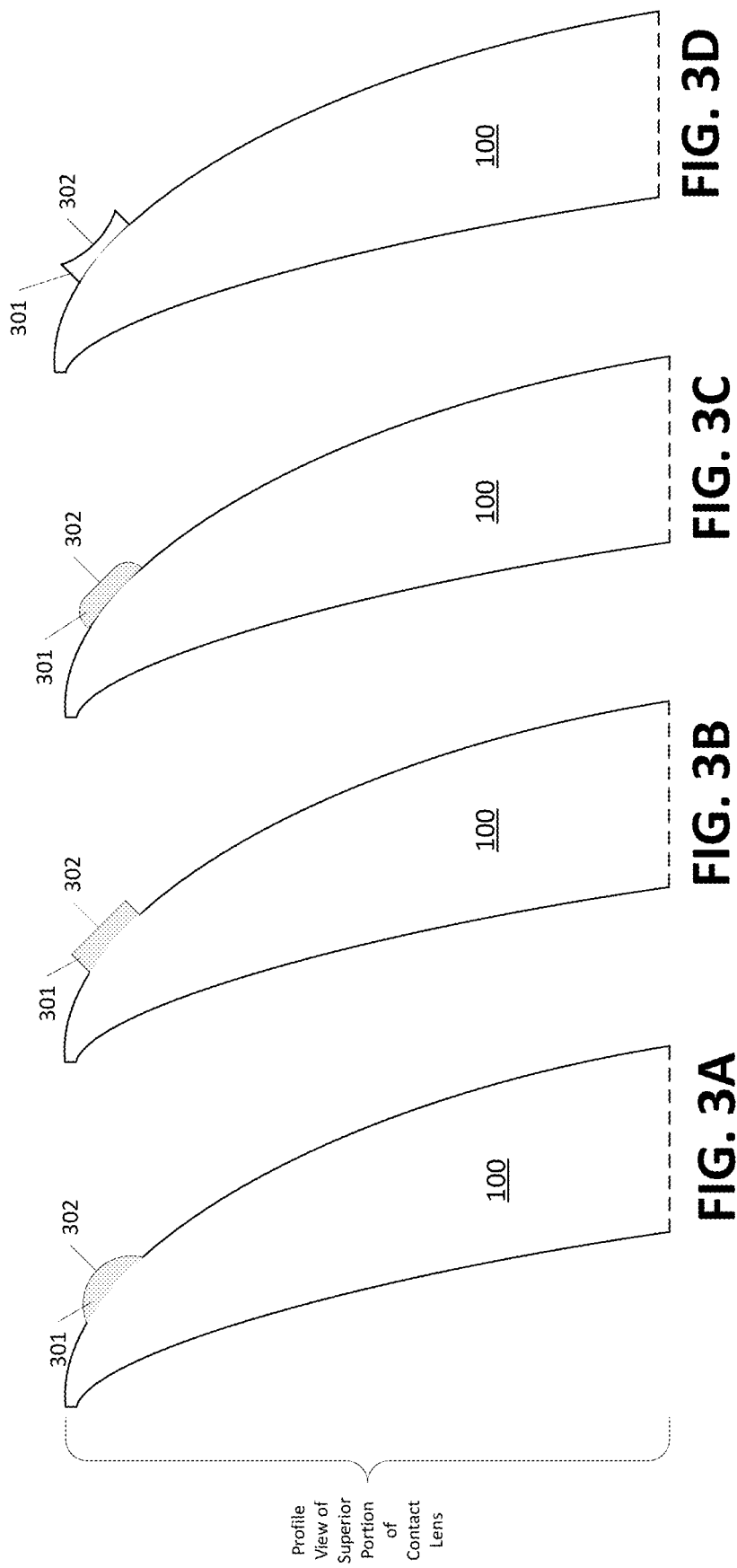

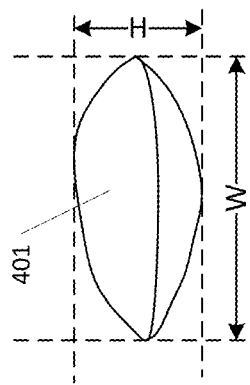
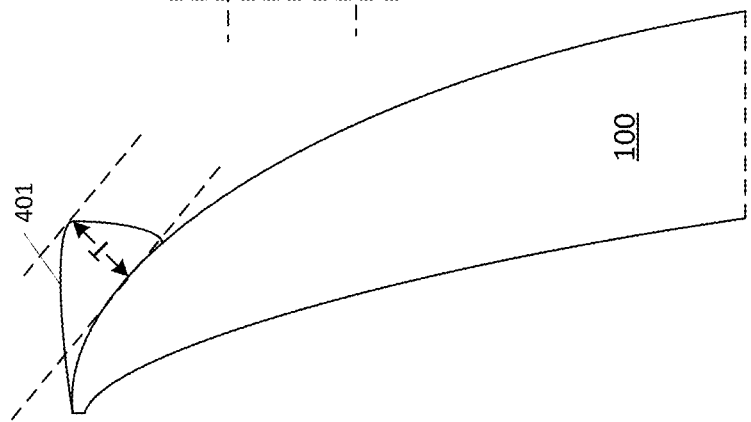
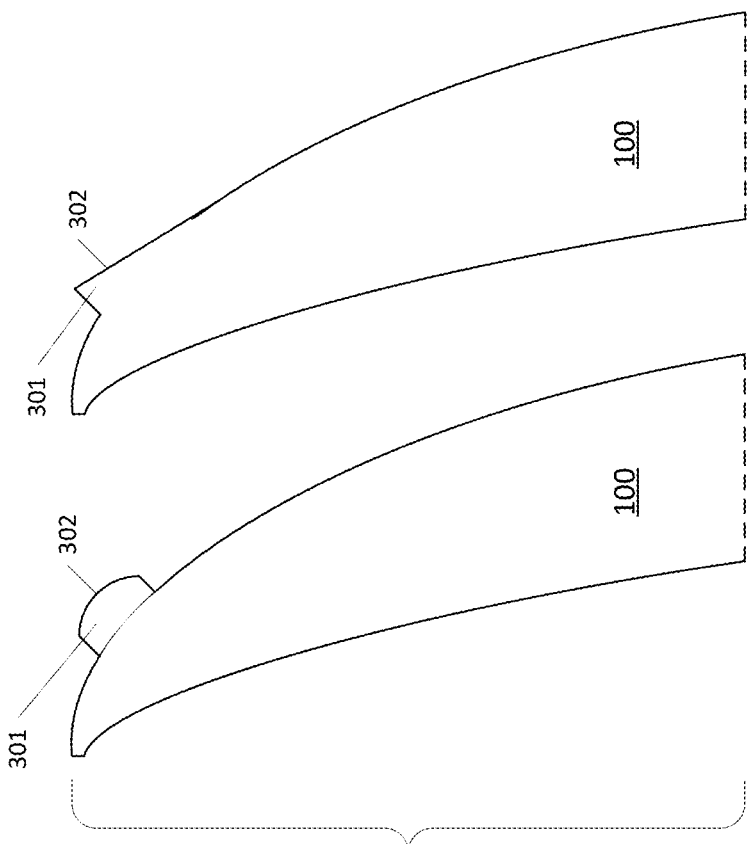

CONTACT LENS COMPRISING A LENTICULAR IN A SUPERIOR PORTION OF THE CONTACT LENS

CROSS-REFERENCE TO RELATED APPLICATIONS

This application is a continuation of U.S. application Ser. No. 16/335,999, filed Mar. 22, 2019, which will issue as U.S. Pat. No. 11,022,816 on Jun. 1, 2021, which is a 371 Application of PCT/US2017/048617 filed Aug. 25, 2017, which is a continuation in part of U.S. application Ser. No. 15/274,159 filed Sep. 23, 2016, which claims benefit of and priority to U.S. Provisional Application No. 62/222,376, filed Sep. 23, 2015, each of which are hereby incorporated in by reference in their entireties.

BACKGROUND

The current state-of-the art in rotational stabilization includes back surface toricity (effective for rigid gas-permeable contact lenses), base-down and peri-ballast prism, or Dynamic Stabilization which is a modification of base-down prism. There are patients for whom one or none of the existing designs are sufficient to provide rotational stabilization for a contact lens.

Traditionally, rigid gas permeable (RGP) contact lenses are fitted with a "lid attachment" fit by either using the naturally thicker edge of a minus-shaped RGP contact lens or by adding minus-carrier lenticular (a thicker edge) to a plus-shaped RGP contact lens. The shape that is used in conventional RGP lenses was probably largely a function of what could be manufactured when lid attachment was first described in the 1970s. With these conventional lens, the thicker edge would be found 360° around the lens periphery. However, the lens does not necessarily need to be that shape in order to achieve lid attachment, and other shapes and designs may provide a better fit that allows the contact lens to translate upwards in downgaze. Translation of the lens in downgaze would allow the use of a true bifocal, distance power in the upper, middle portion of the lens, and near power in the lower portion of the lens. In addition, the lid attachment fit provides rotational stabilization for toric lenses and other applications.

Therefore, what is desired are contact lenses that overcome challenges in the art, some of which are described above.

SUMMARY

Disclosed and described herein is a soft contact lens with a lid-attachment fit. The portion that is used for lid attachment (i.e., the lenticular) is placed only at the top (superior) aspect of the contact lens. With modern manufacturing capabilities, any number of shapes can be implemented to achieve the lid attachment fit.

The present disclosure relates to translating bifocal, trifocal, or multifocal contact lenses that work when the cornea is spherical or toric. For rotational stabilization, the contact lenses disclosed herein have an advantage over base-down prism, peri-ballasting, and Dynamic Stabilization in that it uses the interaction between the lenticular aspect described below and the upper eyelid tarsal plate to stabilize the contact lens and may also use the interaction between the base of the prism and the lower eyelid. Interactions between the lens and one or both eyelids provides better stabilization in the lens design disclosed herein. This same contact lens design will also allow for the contact lens to have a translational movement when the patient looks from straight ahead gaze into downgaze. Instead of pushing the base of the prism in the contact lens upwards with the lower eyelid, as much of the prior art attempts to do, this design pulls the contact lens upwards with the superior lenticular aspect. This is because the lenticular aspect allows the contact lens to use a "lid-attached" fit, wherein the lens stays with the upper lid as the patient looks downwards.

The description below sets forth details of one or more embodiments of the present disclosure. Other features, objects, and advantages will be apparent from the description and from the claims.

BRIEF DESCRIPTION OF THE DRAWINGS

The accompanying figures, which are incorporated in and constitute a part of this specification, illustrate several aspects described below.

FIGS. 1A and 1B show a lenticular 101 comprising a minus-carrier lenticular-like curve located on or proximate the superior edge of the contact lens 100.

FIGS. 1C and 1D are schematic diagrams providing frontal (FIG. 1C) and a profile view (FIG. 1D) of an alternate bifocal contact lens according to lens designs disclosed herein. FIGS. 1C and 1D show a lenticular 101 comprising a minus-carrier lenticular-like curve located further toward the center of the contact lens away from the superior edge of the contact lens 100.

FIGS. 3A-3F are profile schematic images of exemplary contact lens having various shaped lenticulars in a superior portion of the contact lens.

FIG. 4A is a profile schematic image of exemplary contact lens having an exemplary anatomically-shaped lenticular in a superior portion of the contact lens FIG. 4B is a front view of the anatomically-shaped lenticular of FIG. 4A showing width (w) and height (h) dimensions.

DETAILED DESCRIPTION

The present disclosure now will be described more fully hereinafter with reference to specific exemplary embodiments. Indeed, the present disclosure can be embodied in many different forms and should not be construed as limited to the embodiments set forth herein.

Disclosed herein is a contact lens comprising lenticular over an upper (superior) portion of the lens. For example, the lenticular may comprise a rounded, minus-carrier, lenticular-like curve over a central, upper portion of the lens, though other lenticular shapes, designs and locations are contemplated.

The various embodiments of a contact lens disclosed herein comprises a superior-located lenticular design that creates: (1) rotational stability of the contact lens in all gazes, (2) upwards translation, or movement, of the contact lens when the eye is in downward gaze, and (3) a general, centered placement of the contact lens over the cornea and the pupil as needed as the person's gaze changes. By "upwards translation of the contact lens when the eye is in downward gaze" means that the contact lens is held in an upwards position when the patient looks down. The embodiments disclosed and described herein include one or more lenticulars located in a superior portion of the contact lens where the lenticular has any shape that would allow any contact lens (soft, rigid gas permeable, hybrid, etc.) to attach itself to the inside of the upper lid.

Figures 1A, 1B:
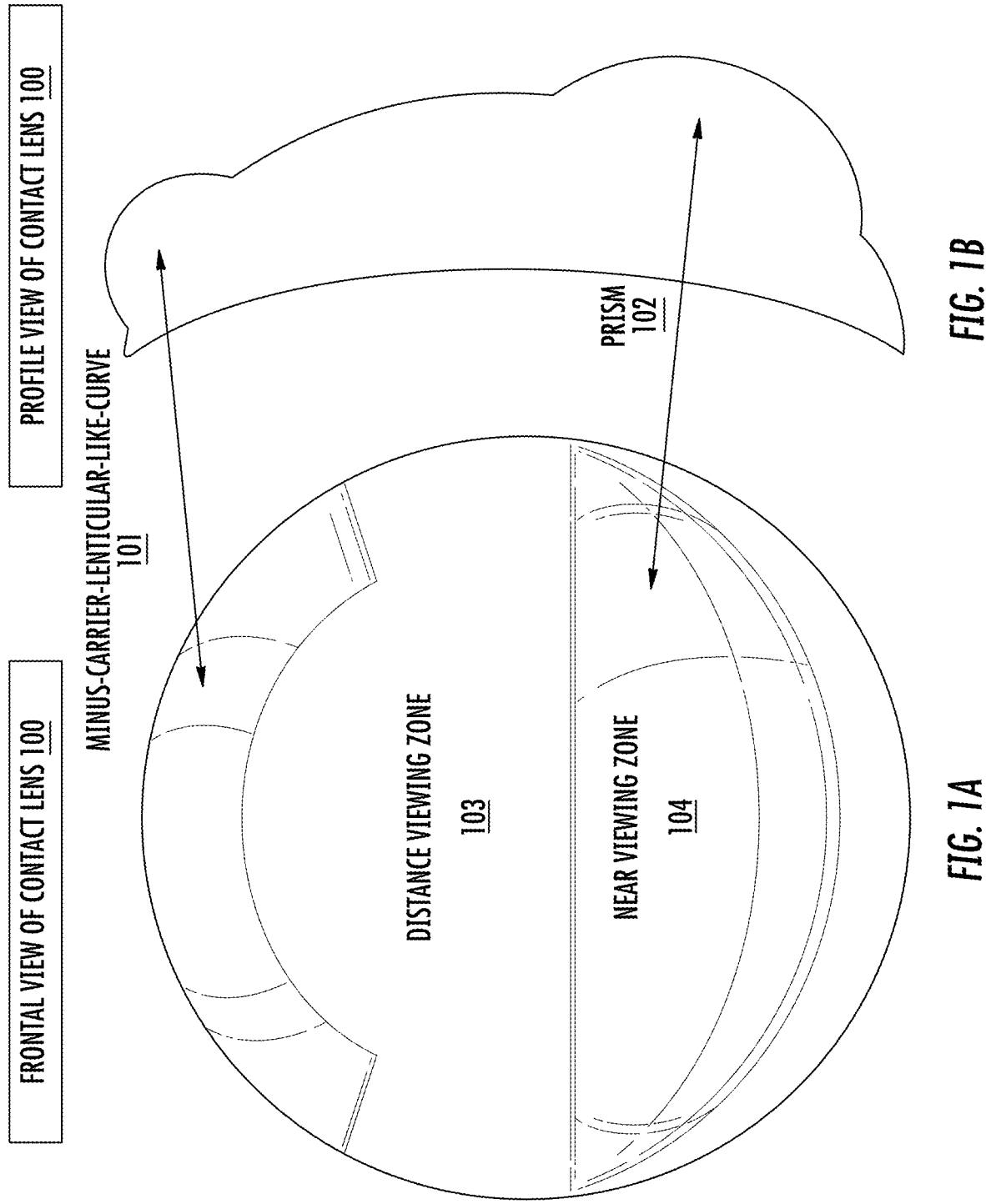
FIGS. 1A and 1B are schematic diagrams providing frontal (FIG. 1A) and a profile view (FIG. 1B) of a bifocal contact lens according to lens designs disclosed herein.

Referring to FIGS. 1A and 1B, a schematic diagram of frontal (FIG. 1A) and profile view (FIG. 1B) of a bifocal contact lens 100 according to lens designs disclosed herein is illustrated. The lens is bifocal in that is has a distance viewing zone 103 and a near viewing zone 104. One of the features of the contact lens shown in FIGS. 1A and 1B is the placement of a lenticular 101 over the upper, central portion of the contact lens. As described herein, the upper portion of the contact lens 100 is referred to as the superior portion and the lower portion of the contact lens 100 is referred to as the inferior portion. Generally the lenticular 101 is located completely in the superior portion of the contact lens 100 above a horizontal midline that passes through the center of the contact lens 100; however, the ends of one or more of the lenticulars may extend into the inferior portion of the contact lens that lies below the horizontal midline. In the embodiment shown in FIGS. 1A and 1B, the lenticular 101 comprises a rounded, minus-carrier-lenticular-like-curve that extends in an arc around a portion of the upper edge of the contact lens 100, though other shapes, sizes and designs of lenticulars 101 are contemplated within the scope of embodiments of this invention and disclosed herein. Another feature of the design shown in FIGS. 1A and 1B is the possible use of prism 102 or a ballast in the lower portion of the contact lens 100. The combined features of the contact lens 100 disclosed herein provide rotational stabilization, translation, and/or centration. The contact lens disclosed herein can be a rigid gas permeable or soft contact lens design, or a hybrid design, such that the contact lens has a rigid center with soft surround. The lens can be made of a material that can sense light activity or molecules in the ocular environment and that contains elements that modulate light or the surrounding ocular environment, i.e., liquid crystal displays, filters, photochromatic materials, compartments containing other materials, or sensors. Though shown in FIGS. 1A and 1B as bifocal lens, it is to be appreciated that the contact lens 100 described herein can be of any vision including single-vision, bifocal, multifocal, and/or toric.

In FIGS. 1A, 1B, 1C and 1D, the lenticular 101 can be seen at the top of the contact lens 100. The lenticular 101 (in this example a minus-carrier-lenticular-like-curve) can be placed at the upper edge of the contact lens 100, as seen in FIG. 1B, or can be located some distance from the edge of the contact 100, as can be seen in FIG. 1D. For example, the lenticular 101 can be located in the central, upper portion of the contact lens 100. The lenticular 101 can be 0.1, 0.2, 0.3, 0.4, 0.5, 0.6, 0.7, 0.8, 0.9, 1.0, 1.5, 2.0, 2.5, 3.0, 3.5, 4.0, 4.5, or 5.0 millimeters, or more, less, or any amount in-between, away from the outer edge of the contact lens 100. A prism 102 or ballast can be located in the lower half of the contact lens 100. The use of prisms is discussed in more detail herein.

The current state-of-the-art in translating contact lenses is a rigid gas permeable contact lens. There are currently no successful soft contact lenses that achieve translating vision. All of the prior art in translating soft contact lenses moves in the opposite direction of this design, i.e., all other designs attempt to thin the upper portion of the contact lens as much as possible, rather than making it thicker and attached to the upper lid. The contact lens disclosed herein provides a translating contact lens, including a soft contact lens, which is more comfortable and requires less adaptation time than a rigid gas permeable lens. Generally speaking, patients are more willing and able to wear a soft contact lens than a rigid gas permeable contact lens, and a soft contact lens requires less expertise to fit. The current state-of-the-art in bifocal or multifocal soft contact lenses is simultaneous vision. In these lenses, both the rays focusing the distance vision and the rays focusing the near vision are within the pupil at the same time. Thus, the patient must be able to ignore the rays that are not in focus. This leads to some degradation of vision. The translating soft contact lens disclosed herein allow only light from one distance to be in focus at a time, providing clearer vision at each distance.

The other current state-of-the-art option for fitting presbyopic patients in soft contact lenses is called monovision. In this case, one eye is powered for distance vision (usually the dominant eye) and one eye is powered for near vision (usually the non-dominant eye). Some patients are unable to adapt to this type of lens, again, especially when the patient requires a greater reading add power. The difference between the two eyes becomes too uncomfortable. Also, it is well established that monovision correction in contact lenses or laser vision correction leads to a loss of depth perception. The translating soft contact lens disclosed herein allows for the use of higher reading add powers without degradation of the quality of distance vision. Because both eyes are fully and equally corrected at distance and near in the disclosed design, there is no induced loss of depth perception. The translating soft contact lens disclosed herein can also have an optical segment that provides a gradient of power change between the distance and near segments.

The contact lens disclosed herein are designed to suit many practical purposes. For example, in both rigid and soft contact lenses, the lens designs disclosed herein provide rotational stabilization in all gazes for toric contact lens designs, contact lenses designed to correct for various types of ocular aberration beyond a spherical correction, for electronically-generated and/or virtual optically displayed images, and/or bifocal or multifocal contact lenses. Additionally, the lens designs disclosed herein create upwards translation of a bifocal/multifocal contact lens in downward gaze. Furthermore, the lens designs disclosed herein achieve a "lid attached" fit similar to rigid gas permeable contact lens, i.e., keep the contact lens attached under the upper lid before, during, and after a blink.

In one embodiment, the upper portion of the contact lens interacts with an upper eyelid of the wearer. The upper portion of the contact lens that interacts with the upper lid can comprise 5, 10, 15, 20, 25, 30, 35, 40, 45, 50, 55, 60, 65, 70, or 75% of the area between the upper edge of the contact lens and the geometric center of the contact lens. For example, the area of the upper portion of the contact lens (meaning the "top half" of the contact lens, or the area between the upper edge and geometric center of the contact lens) that interacts with the upper lid can comprise 10 to 50% of the upper area of the lens.

Conventionally, a minus carrier lenticular can be used in rigid gas permeable contact lenses in order to create a lid attached fit in a plus-shaped contact lens. In the contact lens design disclosed herein, a lenticular 101 is placed in the central, upper portion of the lens only, rather than over a larger portion of the lens circumference. Some embodiments of the lens designs disclosed herein have a smaller area where a relatively thick edge is present to interact with the upper eyelid margin, and the minimal presence of the lenticular improves comfort over a more traditional minus carrier lenticular that would ordinarily be placed over the entire lens circumference. There is enough surface area and thickness of the lenticular present in the contact lens disclosed herein; however, to interact with the upper tarsal plate to assist with centration and rotational stability.

Figure 2:
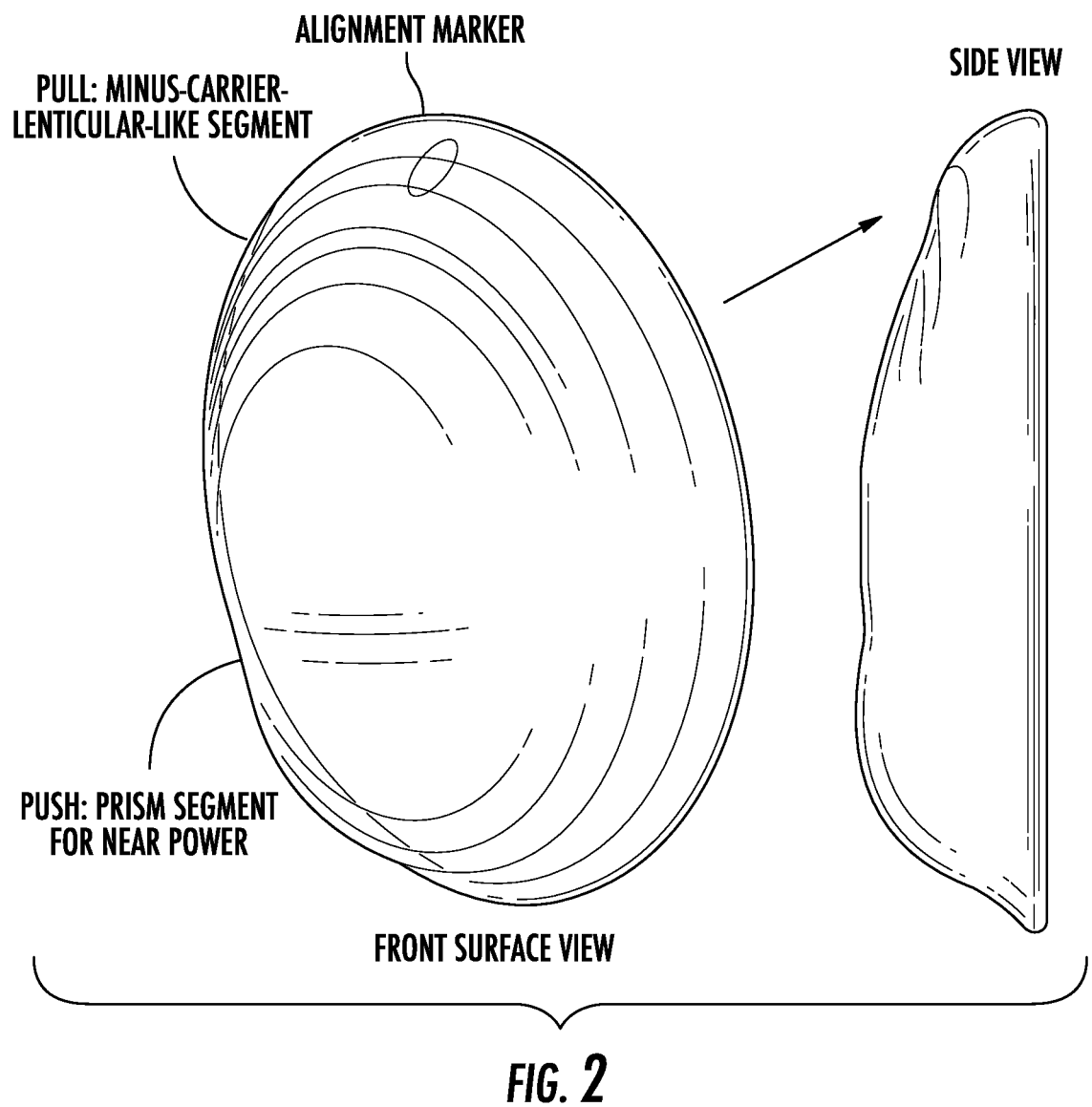
FIG. 2 is a schematic diagram (front view and profile view) of a contact lens showing a "push" and "pull" mechanism associated with a superior lenticular and an inferior prism segment.

As shown in FIG. 2, and referred to herein as a "push" and a "pull" mechanism, in addition to the upper eyelid interacting with the lenticular, the upper eyelid can also interact with an optional prism in the lower portion of the contact lens according to the lens designs disclosed herein. The edge of the upper eyelid squeezes the thicker, base of the prism of the contact lens downwards with each blink. The base of the prism also interacts with the lower eyelid with each blink; therefore, the base of the prism is placed above the lower contact lens margin, high enough to remain above the lower eyelid when the eye is open. Just as multiple base curve options are available for fitting different corneal curvatures, multiple heights of the prism base are optionally used to account for differences in aperture size and position of the eyelids. In addition, multiple overall diameters of the contact lens can also be used. In other words, the prism portion can provide a change in power from the central optic zone of the contact lens. The base of the prism may not slide more than 1, 1.5, 2, 2.5, or 3 millimeters (mm) behind the lower lid, when in the patient is looking straight ahead and/or downwards when the eye is open and during the blink.

As disclosed above, the contact lens comprises a relatively thick area compared to the remaining portion of the contact lens. This area of thickness can be 1.5, 2, 3, 4, 5, 6, 7, 8, 9, or 10 times thicker than the remaining "non-thick" portion of the contact lens. For example, the relatively thick area can comprise a thickest portion, which is 2 to 10 times thicker than the remaining center portion of the contact lens.

The embodiments of contact lens disclosed herein can be used in the correction of ametropia (myopia, hyperopia, astigmatism, and/or higher order aberrations) in patients with or without presbyopia, i.e., a reading add that moves upwards through translation, in patients with other accommodative disorders, and/or patients with a binocular vision disorder can also be provided in the lens designs disclosed herein. Presbyopia affects approximately 100% of the population who live long enough (~45 years of age) to develop the condition. The embodiments of contact lens disclosed herein can also treat other accommodative disorders, or binocular vision disorder. In some instances, embodiments of the contact lens disclosed herein can be used to display an electronically-generated and/or other virtual optically-displayed image.

Conventional contact lenses provide very limited options in terms of design parameters such as diameter and curvature. The disclosed contact lenses achieve translation in a soft contact lens. Soft contact lenses are typically only feasible to manufacture in two base curve options, and very few are offered in multiple diameters. These multiple options in these two parameters in addition to the ability to vary the prism height, size, amount, or axis are optionally considered in the lens designs disclosed herein. Back or front surface toricity takes advantage of a toric, rather than spherical, corneal shape that occurs in some patients with astigmatism. The lenses disclosed herein still work when the cornea is spherical (not toric). The described lenses also have an advantage over base-down prism, peri-ballasting, and Dynamic Stabilization in that it optionally uses a lenticular aspect described above to use the upper eyelid tarsal plate to stabilize the contact lens in addition to the prismatic interaction of the lower lid (in lenses having an inferior prism or ballast). Interactions with both lids can provide better stabilization.

FIGS. 3A-3F are profile schematic images of exemplary contact lens having various shaped lenticulars in a superior portion of the contact lens. Each of the lenticulars 301 have a shaped top surface 302. In FIG. 3A, the lenticular 301 comprises a rounded, minus-carrier, curve 302 over a central, upper portion of the lens. As described herein, the lenticular may be on or proximate to the edge of the contact lens 100, or set back further away from the edge of the lens 100. Further, the lens 100 may include a single lenticular 301, or it can be a plurality of lenticulars having various shapes, sizes and designs. FIGS. 3B-3F illustrate non-limiting examples of profiles of various other lenticulars including a flat-topped 302 lenticular 301 (FIG. 3B), a lenticular 301 having a flat top with rounded edges 302 (i.e., a "bump") (FIG. 3C), a lenticular 301 having a concave top 302 (FIG. 3D), a lenticular 301 having a convex top 302 (FIG. 3E), and a lenticular 301 having a tapered top 302 shape that is thicker closer to the edge of the contact lens and which gradually thins toward the center of the contact lens (FIG. 3F). It is to be appreciated that the lenticulars 301 shown in FIGS. 3A-3F are intended to be non-limiting and are for exemplary purposes only. It is contemplated that the lenticulars of this invention are not limited by shape, size, number, position, or location (so long as they are substantially located within the superior portion of the contact lens).

FIG. 4A is a profile schematic image of exemplary contact lens having an exemplary anatomically-shaped lenticular in a superior portion of the contact lens. In this embodiment, the lenticular is shaped specifically to fit into a conjunctival sac and attach to the upper eyelid of the wearer. For example, the lenticular of FIG. 4A is designed to fit within Kessing's Space of the wearer's upper eyelid (see, Kessing, Svend V., "A New Division of the Conjunctiva on the Basis of X-Ray Examination," Acta Ophthalmologica Vol. 45, 1967, which is fully incorporated by reference.) FIG. 4B is a front view of the anatomically-shaped lenticular 401 of FIG. 4A showing width (w) and height (h) dimensions. In one of the embodiments, the anatomically-shaped lenticular 401 shown in FIGS. 4A and 4B is shaped and sized in accordance with the conjunctival inserts disclosed and described in U.S. Pat. No. 6,217,896, which is fully incorporated by reference.

Although volumetric and linear dimensions vary between individuals, human inferior conjunctival sacs have certain generally common features: a crescent shape horizontally; a thick inferior horizontal ridge and a wedge-like shape sagittally). In order to maximally utilize the actual volume and shape that could be contained in human conjunctival sacs, the anatomically-shaped lenticular 401 can be of a crescent shape in the horizontal plane, with the central back curvature conforming to the bulbar surface (radius of back curvature approximately 14 mm, range 12-18 mm). Most of the volume of the device is contained in the inferior 50% of the shape, within a horizontal ridge situated approximately ⅔ of the way from the top of the lenticular 401 and ⅓ of the way from the bottom of the lenticular 401. The maximum thickness of this ridge, being of a crescent shape in the horizontal plane, is a dimension noted in the table (Table I), below. The front surface of the lenticular 401 is more curved than the back in order to attain the crescent shape. The lenticular 401 tapers superiorly above the ridge, so as to situate between the tarsal plate and the globe, so that the anatomically-shaped lenticular 401 thins to an acute angle at its superior edge. Therefore, in the sagittal plane the lenticular 401 appears wedge-like above the ridge, such that pressure of the inferior margin of the upper eyelid will induce a "minus-carrier" effect and help to contain the lenticular 401 inside inferior cul-de sac. From the middle of the thicker volume in the ridge, the lenticular 401 tapers to blunt points nasally and temporally, such that the lenticular 401 is anchored within the tissue more tightly bound at the canthi. The horizontal length of the lenticular 401 is a dimension, covered in Table I, which is measured along the back surface of the lenticular 401 from left to right behind the ridge. At the bottom, the lenticular is rounded from left to right (radius of curvature approximately 22 mm, range 20-25 mm) and from front to back (radius of curvature approximately 0.75 mm, range 0.5-1.0 mm in the middle) with the most inferior portion of the lenticular 401 at the horizontal middle.

Below, Table I provides exemplary dimensions for three sizes of an anatomically-shaped lenticular 401 (refer to FIGS. 4A and 4B).

TABLE I

DIMENSIONS OF THREE DESIGNS OF AN ANATOMICALLY-SHAPED LENTICULAR

| DIMENSIONS | Three Designs by Size | | |
| --- | --- | --- | --- |
| | LARGE | MEDIUM | SMALL |
| Volume (μl) | 160 | 110 | 60 |
| Max. Horizontal Width (W) (mm) | 26.75 | 23.5 | 20.25 |
| Max Vertical Height (H) (mm) | 9.0 | 7.9 | 6.8 |
| Max. Thickness (T) (mm) | 2.6 | 1.7 | 0.8 |

Figure 4C:
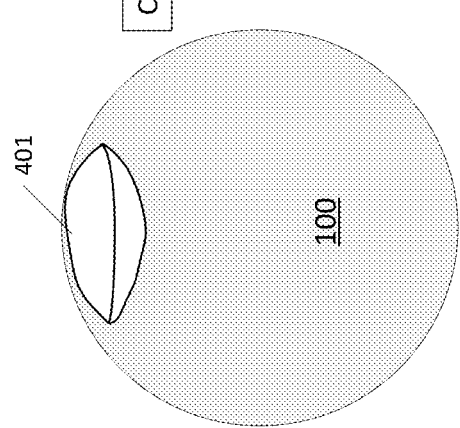
FIG. 4C is a front view of a contact lens having an anatomically-shaped lenticular in a superior portion of the contact lens.

From the thickest sagittal plane at its horizontal midpoint, the anatomically-shaped lenticular 401 to the right has a shape of equal, but opposite, conformation to that existing on the left. This is so that the anatomically-shaped lenticular 401 will be wearable in the cul-de-sac of either eye, the left/right shape difference between conjunctival sacs of the two eyes having been shown to be minimal. The vertical height of the insert (or thickness, T) (see FIG. 4A), another dimension noted in Table I, is maximum at the center of the insert and decreases left and right to the blunt lateral extremities. This is because the anatomically-shaped lenticular 401 is somewhat meniscus-shaped in the facial plane, being more convex at its inferior edge and relatively flat horizontally at the superior edge. FIG. 4C is a front view of a contact lens 100 having an anatomically-shaped lenticular 401 in a superior portion of the contact lens.

Additional non-limiting examples of anatomically-shaped lenticulars includes lenticulars having shapes that include round/oval, ellipse, triangular, heart shaped, square, pentagonal, diamond, pear shaped, rectangular, combinations thereof, and the like such that the lenticular is shaped to fit into a conjunctival sac and attach to the upper eyelid of the wearer.

Figure 5B:
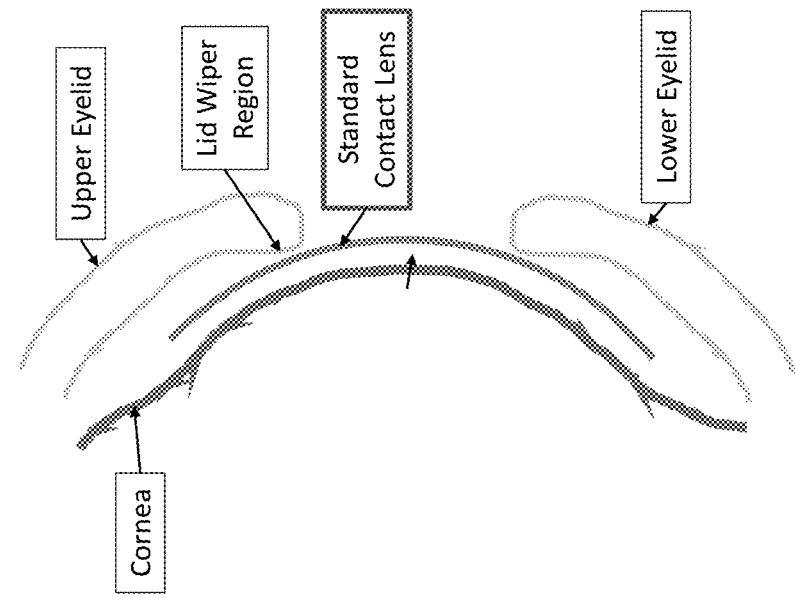
FIGS. 5A and 5B are profile images of eyes that illustrate the lid attachment fit of contact lens having a lenticular in the superior portion of the lens as compared with a contact lens that does not have a lenticular.
Figure 5A:
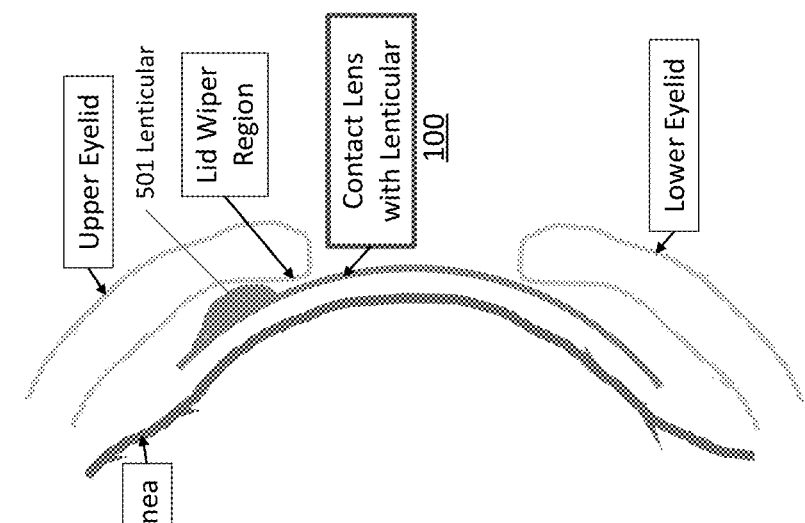

FIGS. 5A and 5B are profile images of eyes that illustrate the lid attachment fit of contact lens 100 having a lenticular 501 in the superior portion of the lens as compared with a contact lens that does not have a lenticular. In various embodiments, the lenticular 501 may be anatomically-shaped to attach to the upper eyelid by fitting within a conjunctival sac.

Figure 6A:
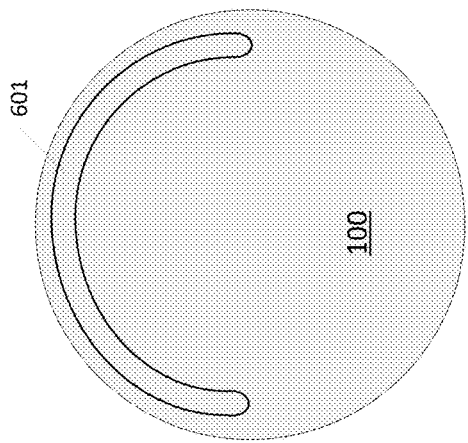
FIGS. 6A-6J illustrate front views of contact lens having non-limiting examples of lenticulars as disclosed and described herein.
Figure 6B:
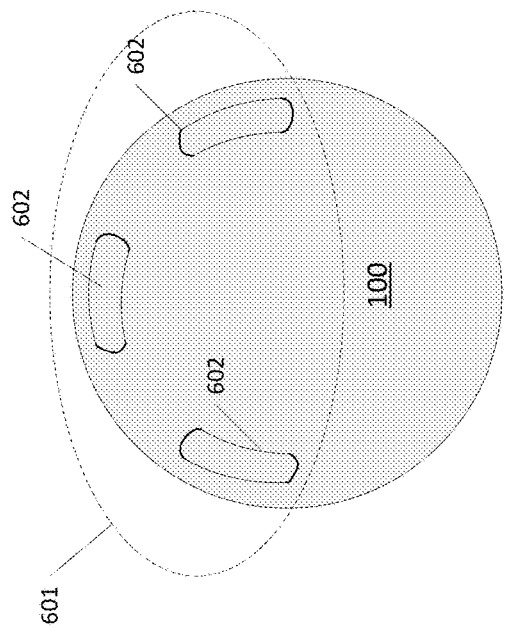
Figure 6C:
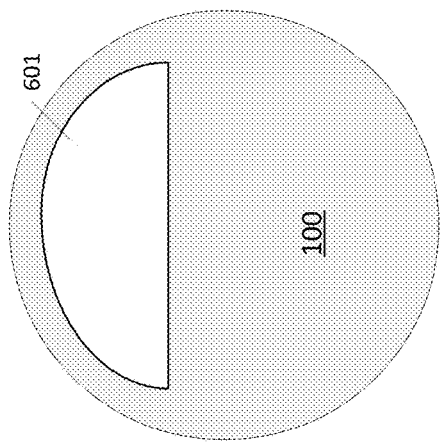
Figure 6D:
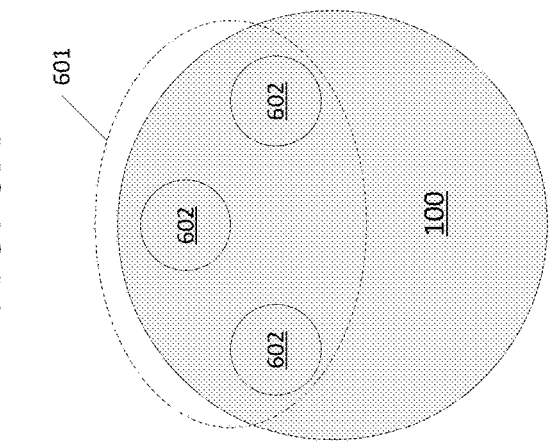
Figure 6H:
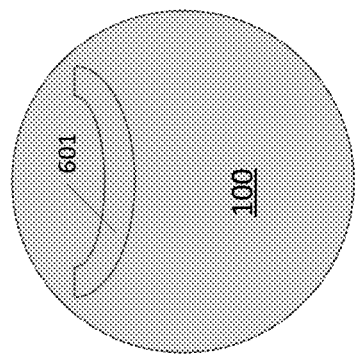
Figure 6G:
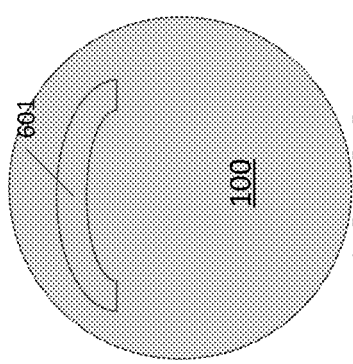
Figure 6J:
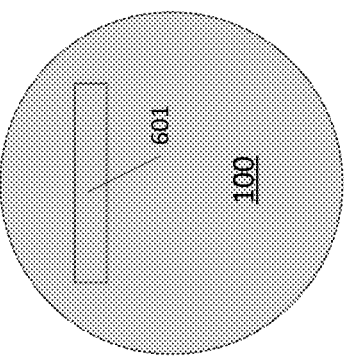
Figure 6F:
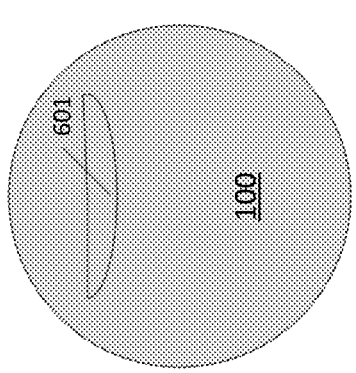
Figure 6I:
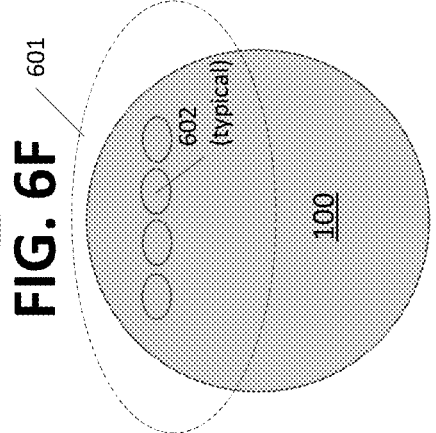
Figure 6E:
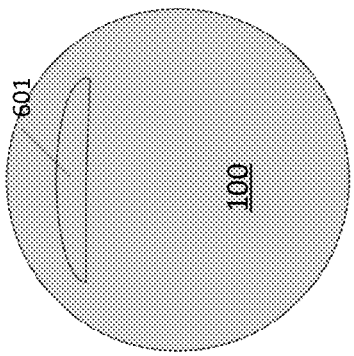

FIGS. 6A-6J illustrate front views of contact lens having non-limiting examples of lenticulars in the superior portion of the contact lens as disclosed and described herein. It is to be appreciated that the lenticular regions of the embodiments shown in FIGS. 6A-6J have at least a portion of the lenticular where the thickness of the lenticular is greater than the thickness of the lens at its center portion. In FIG. 6A, the lenticular 601 has a semicircular shape. In FIG. 6B, the lenticular 601 has an arc shape. It is to be appreciated that the arc length can be shorter or longer that the length shown in FIG. 6B. In FIGS. 6C and 6D, the lenticular 601 is comprised of a plurality of lenticular sections 602. For example, the lenticular 601 of FIG. 6C is comprised of a plurality of semispherical sections on the superior portion of the contact lens and the lenticular 601 of FIG. 6D is comprised of a plurality of arc sections. It is to be appreciated that the multi-section lenticulars of FIGS. 6C and 6D are exemplary and that other numbers of sections, shapes and sizes of lenticulars are contemplated within the scope of embodiments of the invention. FIGS. 6E-6J illustrate non-limiting examples of other shapes, sizes, positions and locations of lenticulars 601 that are contemplated within the scope of embodiments of the invention. Each of the embodiments shown herein may have, or may not have, prisms and/or ballasts in the inferior portion of the contact lens 100.

Also disclosed herein are methods of making the contact lenses disclosed herein. For example, disclosed is a method of making a contact lens, the method comprising manufacturing a contact lens comprising forming a lenticular in the superior portion of the lens. The contact lens can further comprise a base down prism or a ballast in the inferior portion of the lens. In one example, the base down prism or ballast is added to the lens in a second step of a manufacturing process.

Also disclosed is a method of treating an individual in need of vision correction, the method comprising dispensing the contact lens disclosed herein to the individual, thereby treating the individual in need of vision correction. In one example, the individual has been diagnosed with ametropia (e.g., astigmatism, myopia, hyperopia). In another example, the individual has been diagnosed with presbyopia, another accommodative disorder, and/or a binocular vision disorder. For example, one or more surfaces of embodiment of the contact lens described herein can be made toric (to treat astigmatism), and/or a flatter or a steeper front surface can be formed in the embodiments of contact lens described herein (to correct either myopia or hyperopia), and/or a bifocal/trifocal/multifocal change in power can be formed in the bottom (inferior portion) of the lens to treat presbyopia. Additional medical use of embodiments of the contact lens described herein include treatment of Keratoconus.

Furthermore, embodiments of the disclosed contact lens can be used for cosmetic purposes such as changing/enhancing eye color and/or eye appearance.

As used in the specification, and in the appended claims, the singular forms "a," "an," "the," include plural referents unless the context clearly dictates otherwise.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A contact lens comprising:
a front surface; and
a back surface, wherein the back surface is proximate an eye of a wearer when in place on the eye of the wearer;
wherein the contact lens has a first thickness in a superior portion of the contact lens that is greater than a second thickness at a central portion of the contact lens, said thickness defined by an axial distance between the front surface and the back surface;
wherein the first thickness interacts with an upper tarsal plate of an upper eyelid of the wearer and said first thickness is configured to attach the contact lens to the upper eyelid, said attachment translating the contact lens upwards in a downgaze of the wearer, and
wherein the first thickness has a top surface, said top surface having a shape selected from the group consisting of flat, flat with rounded corners, concave, convex or tapered having a thicker portion closer to an edge of the contact lens, or combinations thereof.

2. The contact lens of claim 1, wherein the contact lens is one of a soft contact lens, a rigid gas permeable contact lens, or a hybrid contact lens.

3. The contact lens of claim 1, wherein the first thickness interacting with the upper tarsal plate of the upper eyelid of the wearer provides centration and rotational stability to the contact lens.

4. The contact lens of claim 1, wherein the first thickness is comprised of a plurality of sections, each section have a thickness that is thicker than the second thickness at the central portion of the contact lens.

5. The contact lens of claim 1, wherein the first thickness is anatomically-shaped.

6. The contact lens of claim 5, wherein the anatomical shape of the first thickness is designed to fit within Kessing's Space of the wearer's upper eyelid.

7. A contact lens comprising:
a front surface; and
a back surface, wherein the back surface is proximate an eye of a wearer when in place on the eye of the wearer;
wherein the contact lens has a first thickness in a superior portion of the contact lens that is greater than a second thickness at a central portion of the contact lens, said thickness defined by an axial distance between the front surface and the back surface;
wherein the first thickness interacts with an upper tarsal plate of an upper eyelid of the wearer and said first thickness is configured to attach the contact lens to the upper eyelid, said attachment translating the contact lens upwards in a downgaze of the wearer, and
wherein the second thickness is comprised of a plurality of sections, each section thicker than the second thickness at the central portion of the contact lens.

8. The contact lens of claim 7, wherein the contact lens is a soft contact lens, a rigid gas permeable contact lens, or a hybrid contact lens.

9. The contact lens of claim 7, wherein the first thickness interacting with the upper tarsal plate of the upper eyelid of a wearer provides centration and rotational stability of the contact lens.

10. The contact lens of claim 7, wherein at least one of the plurality of sections is anatomically-shaped.

11. The contact lens of claim 10, wherein the anatomical shape of the at least one section of the plurality of sections is designed to fit within Kessing's Space of the wearer's upper eyelid.

12. The contact lens of claim 7, wherein each section of the plurality of sections has a shape selected from the group consisting of arced, curved, round, circular, hemispherical, square, rectangular, triangular, oval, multi-sided, and combinations thereof.

13. The contact lens of claim 7, wherein each section of the plurality of sections has a top surface, said top surface having a shape selected from the group consisting of curved, round, spherical, flat, flat with rounded corners, concave, convex or tapered having a thicker portion closer to an edge of the contact lens, or combinations thereof.

14. A contact lens comprising:
a front surface; and
a back surface, wherein the back surface is proximate an eye of a wearer when the contact lens is in place on the eye of the wearer;
wherein the contact lens has a first thickness in a superior portion of the contact lens that is greater than a second thickness at a central portion of the contact lens, said thickness defined by an axial distance between the front surface and the back surface;
wherein the first thickness interacts with an upper tarsal plate of an upper eyelid of the wearer and said first thickness is configured to attach the contact lens to the upper eyelid, said attachment translating the contact lens upwards in a downgaze of the wearer, and
wherein the first thickness has an anatomical shape.

15. The contact lens of claim 14, wherein the contact lens is a soft contact lens, a rigid gas permeable contact lens, or a hybrid contact lens.

16. The contact lens of claim 14, wherein the first thickness interacting with the upper tarsal plate of the upper eyelid of a wearer provides centration and rotational stability.

17. The contact lens of claim 14, wherein the first thickness is comprised of a plurality of sections located in the superior portion of the contact lens, each section of the plurality of sections thicker than the second thickness at the central portion of the contact lens.

18. The contact lens of claim 14, wherein the anatomical shape of the first thickness is designed to fit within Kessing's Space of the wearer's upper eyelid.

\* \* \* \* \*